Patented July 3, 1945

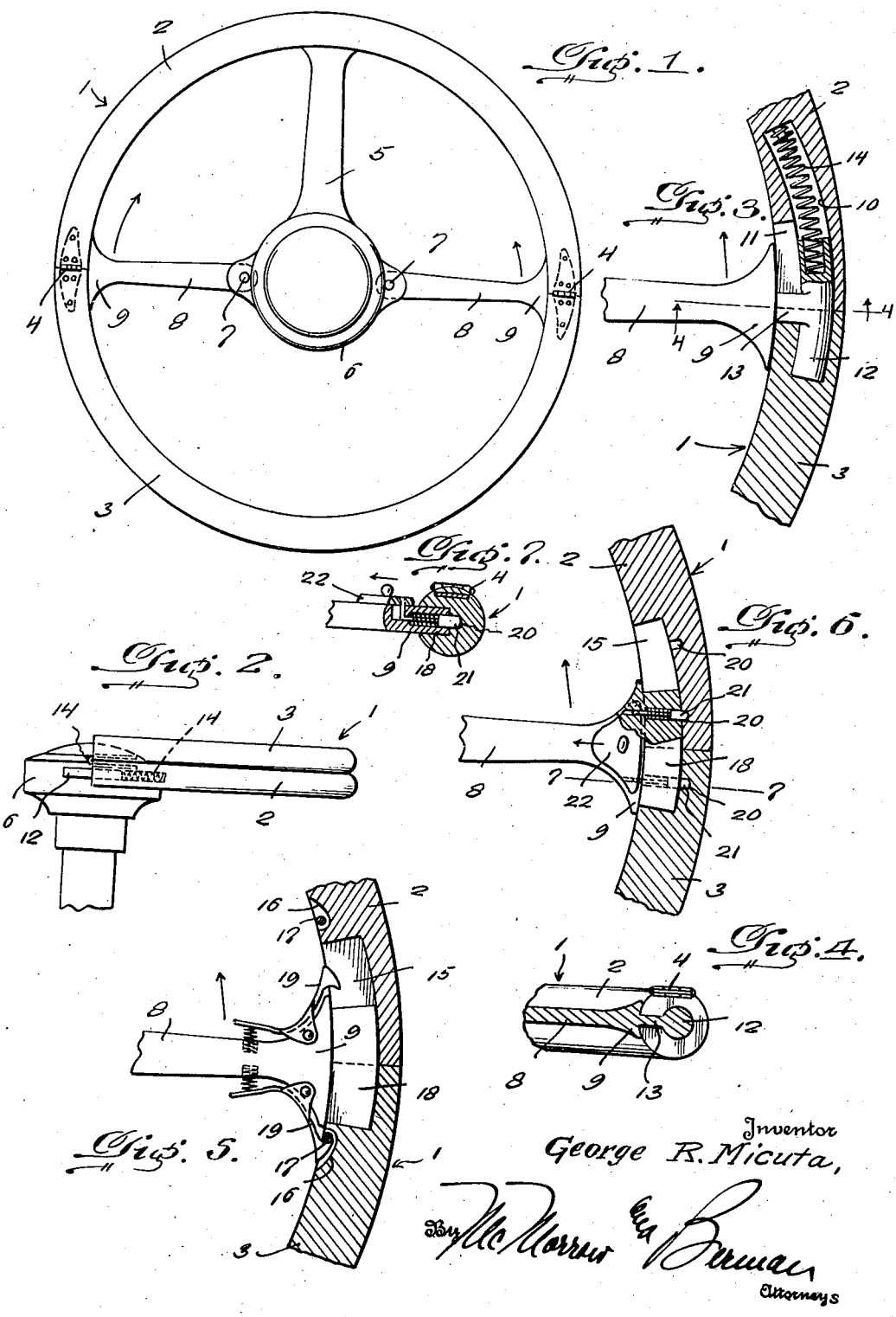

2,379,492

UNITED STATES PATENT OFFICE 2,379,492

STEERING WHEEL

George R. Micuta, Waterbury, Conn.

Application July 12, 1944, Serial No. 544,482

6 Claims. (Cl. 74—555)

The present invention relates to new and useful improvements in steering wheels particularly for motor vehicles and has for its primary object to provide, in a manner as hereinafter set forth, a device of this character comprising a foldable rim section which is adapted to be expeditiously swung to an out-of-the-way position when more room is desired as, for example, when the operator is entering or leaving the vehicle.

Another very important object of the invention is to provide a steering wheel of the aforementioned character which embodies unique means for firmly locking the hinged rim section in unfolded or operative position.

Other objects of the invention are to provide a foldable steering wheel which will be comparatively simple in construction, strong, durable, compact, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a top plan view of a foldable steering wheel constructed in accordance with the present invention.

Figure 2 is a view in side elevation, showing the wheel in folded position.

Figure 3 is a fragmentary view in horizontal section, showing the locking means for the foldable rim section.

Figure 4 is a sectional view, taken substantially on the line 4—4 of Figure 3.

Figure 5 is a view in horizontal section, showing a modified means for locking the hinged rim section in open or operative position.

Figure 6 is a view in horizontal section, showing another modification of the locking means.

Figure 7 is a detail sectional view taken on the line 7—7 of Figure 6.

Referring now to the drawing in detail, it will be seen that reference character 1 designates generally a rim of suitable material, preferably plastic. The rim 1 includes a stationary front section 2 and a swinging or foldable rear section 3. Substantially concealed hinges 4 connect the section 3 to the section 2 for swinging thereon. The rim section 2 is fixed, at an intermediate point, on a spoke 5 which is stationary on the hub 6.

Pivotally secured at 7 on diametrically opposite sides of the hub 6 are swinging spokes 8 comprising flared outer end portions 9. The hingedly connected end portions of the rim sections 2 and 3 have formed therein elongated arcuate chambers 10. These chambers, as shown, are formed on a radius from the respective pivots 7 of the swingable spokes 8. Circumferential slots 11 in the inner portion of the rim 1 communicate with the chambers 10.

Arcuate latch bars or the like 12 on the outer ends of the swinging spokes 8 are operable in the chambers 10. Shanks 13 connect the bars 12 rigidly to the spokes 8. Coil springs 14 are mounted in the end portions of the stationary rim section 2 in the chambers 10 for yieldingly urging the bars 12 into the chambered end portions of the foldable rim section 3 for securing same against swinging movement into open or inoperative position.

It is thought that the operation of the invention as thus far described will be readily apparent from a consideration of the foregoing. Briefly, with the bars 12 yieldingly secured in the position shown in Figure 3 of the drawing by the coil springs 14, the rim section 3 is locked in closed or operative position on the section 2. To swing the rim section 3 to folded or inoperative position on the section 2, as seen in Figure 2 of the drawing, the spokes 8 are swung forwardly as indicated by the arrows in Figure 1. In this manner the bars 12 are disengaged from the rim section 3 against the tension of the coil springs 14, thus freeing said rim section 3 which may now be folded upwardly and forwardly on the section 2.

In the modification shown in Figure 5 of the drawing, the sections 2 and 3 have formed in their end portion circumferentialy elongated chambers 15 which communicate throughout their length and at their sides with the inner periphery of the rim 1. Adjacent the ends of the chambers 15, the rim 1 has formed in its inner periphery pairs of opposed notches or recesses 16. Vertical pins 17 traverse the recesses 16.

An arcuate bar 18 is fixed on the flared outer end portion 9 of each of the pivoted or swinging spokes 8. Pivotally mounted on the end portions 9 of the swinging spokes 8 are spring pressed latches 19. The latches 19 are engageable with the adjacent pins 17 for releasably securing the bars 18 in operative and inoperative position.

In use, with the bars 18 engaged in the hinged end portions of the rim section 3, as seen in Figure 5 of the drawing, said rim section 3 is positively secured in closed or operative position. To release the rim 3 to be folded or swung to inoperative position on the section 2, the spokes 8 are swung forwardly after first disengaging the lower latches 19 from their respective pins 17. When the bars 18 are thus swung completely into the end portions of the stationary rim section 2, the upper latches 19 snap into engagement with the corresponding pins 17 of the upper recess 16 and the folding rim section 3 is free to be swung upwardly and forwardly.

In the embodiment of Figure 6 of the drawing, the chambers 15 have formed in their outer walls a plurality of spaced sockets 20. Bolts 21 are slidably mounted in the bars 18 and engageable in the sockets 20 for releasably locking said bars 18 in either operative or inoperative position. Suitable means 22 are provided for retracting the bolts 21 to permit the spokes 8 to be swung forwardly and rearwardly.

With the bars 18 engaged in the end portions of the rim section 3, as shown in the drawing, said rim section 3 is positively secured against swinging movement in either open or operative position. To release the rim section 3 for folding on the section 2, the bolts 21 are retracted and the spokes 8 are swung forwardly, thus disengaging the bars 18 from the section 3 and swinging said bars completely within the end portions of the section 2.

It is believed that the many advantages of a folding steering wheel constructed in accordance with the present invention will be readily understood and although preferred embodiments of the device are as illustrated and described, it is to be understood that further modifications and changes in the details of construction may be resorted to which will fall within the scope of the invention as claimed.

What is claimed is:

1. A foldable steering wheel comprising a hub, spokes at least one of which is medial and rigidly and supportedly attached to said hub and a diametrically opposed pair of which pivotally mounted at their inner ends on the hub, a rim mounted on said spokes and including hingedly connected stationary and folding half sections, the stationary section being rigidly attached medially to said rigid spoke and the folding section being hingedly attached at its ends to the ends of said stationary section, and means on the swingable spokes for releasably locking the folding rim section in open position.

2. A foldable steering wheel comprising a hub, a stationary rim half section mounted rigidly and supportedly on said hub, a folding rim half section hingedly and supportedly attached at its ends to the ends of said stationary section, diametrically opposed swingable spokes pivotally mounted at their inner ends on said hub, and means for slidably connecting the outer ends of said swingable spokes to the meeting hinged ends of both rim sections whereby to releasably lock the folding rim section in closed operative position and upon release of said means permitting movement of said folding section to an open inoperative position on the stationary rim section.

3. The steering wheel structure as set forth in claim 2 wherein the means for slidably connecting the ends of the swingable spokes to the hinged rim section comprises members on the outer ends of said swinging spokes fitted to operate slidably in arcuate chambers provided therefor in the meeting ends of said hinged sections, said end members of said swinging spokes being located constantly within the chambers of said stationary rim section, means for yieldably urging said spoke end members with a portion thereof into the chambers of said foldable rim section, in the closed operative position of said foldable sections, said end members of the swingable spokes being movable out of the chambers of said foldable rim section by a retractive operation of said swingable spokes.

4. A foldable steering wheel comprising a hub, a stationary rim section rigidly and supportedly mounted on said hub, a folding rim section having its ends hingedly connected to the ends of the stationary rim section, the end portions of said sections having arcuate chambers therein to communicate endwise in the closed position of the foldable rim section, and further having inner circumferential slots communicating with said chambers, swingable spokes pivotally mounted at their inner ends on the hub, shanks on the free ends of said swinging spokes operable in the circumferential slots of said rim members, arcuate bars on said shanks slidable in the rim section chambers, and coil springs in said chambers engaged with the bars for yieldingly urging said bars into the end portions of the folding rim section chambers, said bars constituting means for releasably locking the foldable rim section in open operative position on the stationary section of the rim, and, upon release, permitting the foldable rim section to move to an open inoperative position on the stationary section.

5. A foldable steering wheel comprising a hub, a rim mounted on the hub and including hingedly connected stationary and foldable sections meeting one another and end portions of said sections having arcuately extending chambers therein communicating endwise in the closed operative position of the foldable rim section, catches on the rim sections adjacent the inner ends of the chambers therein, spokes pivotally mounted at their inner ends on the hub, bars on the outer ends of said spokes operable in the chambers of said rim sections for slidably connecting said spokes to the rim and for releasably locking the folding rim section in open operative position, and latches on opposite sides of the pivotally mounted spokes adjacent the outer ends of the spokes and engageable with the catches for releasably securing said spokes against swinging movement with the bars thereon in either an operative position to hold the bars in the foldable end section in its closed operative position, or in a position to permit movement of said foldable rim section to an open inoperative position.

6. A foldable steering wheel comprising a hub, a rim mounted on said hub and including hingedly connected stationary and foldable sections meeting one another and end portions of said sections having arcuately extending chambers therein communicating endwise in the closed operative position of the foldable rim section, the outer walls of said chambers having sockets therein, spokes pivotally mounted at their inner ends on the hub for swinging movement, bars on the outer ends of the spokes operable in the chambers of said rim sections for slidably connecting said spokes to the rim and for releasably locking the foldable section in open operative position, and bolts slidable in said bars and releasably engageable in the sockets of the rim section chambers for releasably securing said bars in either an operative position to hold the bars in the foldable rim section in its closed operative position, or in a position to permit movement of said foldable rim section to an open inoperative position.

GEORGE R. MICUTA.